(No Model.)
E. G. WATSON.
HOSE COUPLING.
No. 366,541. Patented July 12, 1887.
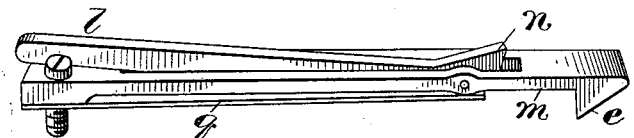
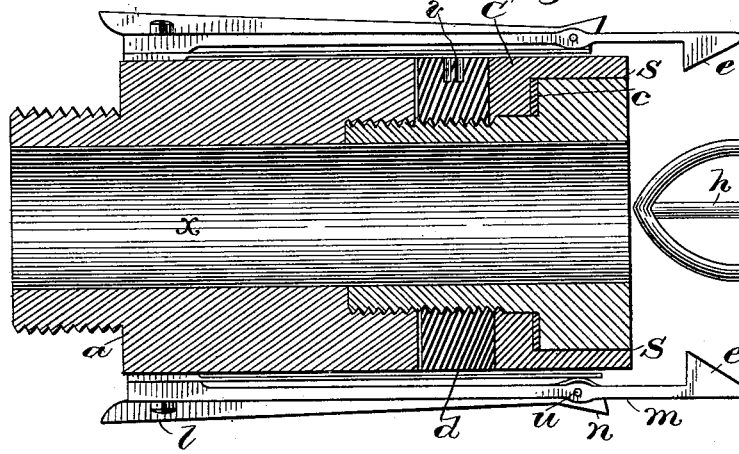 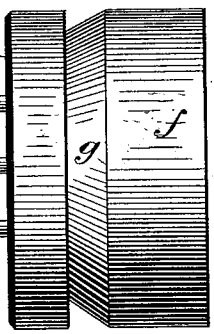
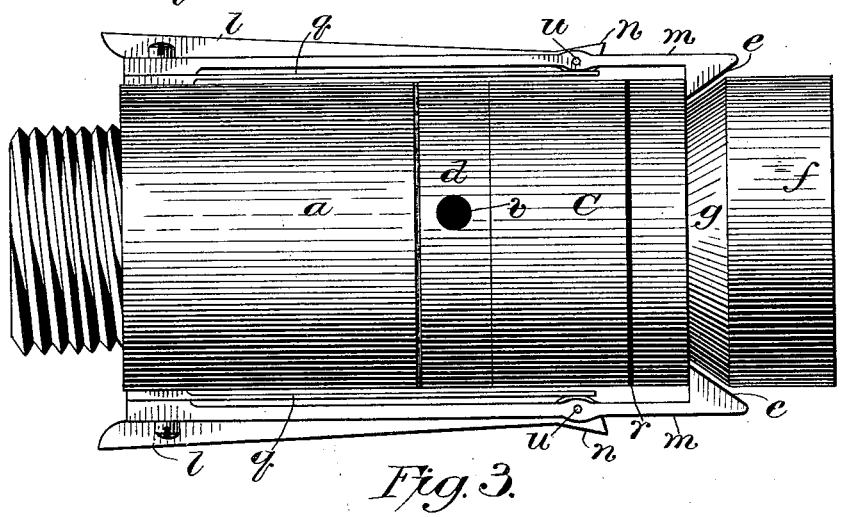
Witnesses
Edw. J. Tanner
J. A. Rutherford
Inventor
Elias G. Watson
By his Attorney

United States Patent Office.

ELIAS G. WATSON, OF NEW BEDFORD, MASSACHUSETTS, ASSIGNOR OF ONE-THIRD TO H. W. MASON, OF SAME PLACE.

HOSE-COUPLING.

SPECIFICATION forming part of Letters Patent No. 366,541, dated July 12, 1887.

Application filed February 10, 1887. Serial No. 227,234. (No model.)

*To all whom it may concern:*

Be it known that I, ELIAS G. WATSON, a citizen of the United States, residing at New Bedford, in the county of Bristol and State of Massachusetts, have invented a new and useful Improvement in Hose-Couplings, of which the following is a specification.

My invention relates to that class of couplings which are designed to couple hose through which fluid is conveyed under pressure, especially those used in fire-department apparatus; and it has for its object to furnish a hose-coupling which can be operated instantly and effectually, in order to save valuable time at the commencement of a fire.

To this end my invention consists in the device illustrated in the accompanying drawings, in which—

Figure 1 is a view in longitudinal cross section of a part of the coupling. Fig. 2 is a side elevation of the second part of the coupling. Fig. 3 is a view of the coupling as it appears when coupled together; and Fig. 4 is a side view of one of the springs with its relieving-lever, which serves to couple the two parts together.

In Fig. 1, which is a view of the first part of the coupling, the component parts are $a$, (which is the base, and to which one end of the hose is attached,) into which is screwed the part $b$. The part $b$ is furnished with the collar $c$, which slides on over the screw-threads and the screw-threaded collar $d$. Between the shoulders of the collar $c$ and the part $b$ is interposed the packing $o$.

In Fig. 2, which is a view of the second part of the coupling, $f$ is the base, to which one end of the hose is attached, and which is furnished with the shoulder $g$ and cone-shaped guide $h$. The guide $h$ is cut away at the sides, so as to admit the free flow of water through the way $x$ of the coupling. The part $b$ is also furnished with the packing-ring $r$.

Fig. 3 shows the two parts of the coupling adjusted together, and retained in place by means of the springs $m$. The springs $m$ are securely fastened to the base $a$, and are furnished with square-shouldered catches $e$, which, when the coupling is adjusted together, as shown, take onto the shoulder $g$. The springs $m$ are also furnished with the levers $l$, having eccentric-shaped ends $n$, which are pivoted in a slot in the spring made for the purpose at $w$. A light spring, $q$, is interposed between the spring $m$ and the base $a$, whose end bears against the end $n$ of the lever $l$, and serves to keep the lever $l$ in the position shown until such time as it is desired to uncouple the coupling, as is clearly shown in Fig. 4.

The operation of the device is as follows: The parts Figs. 1 and 2 being attached to the ends of hose, they are adjusted together by entering the cone-shaped guide $h$ in the way $x$, and forcing them together until the catches $e$ of the springs $m$ take on the shoulder $g$. If it is desired to further tighten the connection, a lever is inserted in the hole $v$ of the collar $d$ and the collar turned toward the right, which action throws the collar forward by means of its screw-thread against the face of the collar $c$ and forces its face $s$ against the packing-ring $r$ of the part $f$, and makes a perfectly tight connection. It will thus be seen that, in order to couple hose by means of the coupling here illustrated, it is only necessary to force them together, which operation can be performed in a fraction of a second. In order to uncouple, the levers $l$ are thrown outward until they stand at right angles with the surface of the coupling, when, by means of their eccentric ends $n$, the catches $e$ of the springs $m$ are disengaged from the shoulder $g$, and the parts can be drawn apart without difficulty.

It will be observed that if necessary the collar $d$ may be dispensed with, in which case the collar $c$ would be screw-threaded; but I prefer to use the collar $d$, because in tightening the connection the pressure on the packing-rings $o$ and $r$ is straight. It will also be observed that the guide $h$ might be dispensed with if four or three springs, $m$, were used, instead of two; but I regard it as most practical when provided with the guide $h$.

The springs $q$ are not essential to the operation of the coupling; but I regard them as of value beyond holding the levers $l$ in place, inasmuch as they prevent the abrasion of the coupling by the ends of said levers in uncoupling.

Having thus described my invention, what

I claim, and desire to secure by Letters Patent, is—

1. In a hose-coupling, the combination of the part $a$, internally threaded at one end and externally threaded at the other, the part $b$, having a reduced externally-threaded end to engage the internal threads of the part $a$, the intermediate collars, $c\ d$, the part $f$, having a shoulder, $g$, the spring-catches $m$, located on the part $a$ and adapted to engage the shoulder $g$, and the eccentric-levers $l$, pivoted in slots formed in said spring-catches, substantially as described.

2. In a hose-coupling, the combination of the part $a$, internally threaded at one end and externally threaded at the other, the part $b$, having a reduced externally-threaded end to engage the internal threads of the part $a$, the intermediate collars, $c\ d$, the part $f$, having a shoulder, $g$, and conical guide $h$, the spring-catches $m$, located on the part $a$ and adapted to engage the shoulder $g$, and the eccentric-lever $l$, pivoted in slots formed in said spring-catches, substantially as described.

ELIAS G. WATSON.

Witnesses:
HENRY W. MASON,
THOS. M. JAMES.